United States Patent [19]

Rodesch

[11] Patent Number: 4,475,132

[45] Date of Patent: Oct. 2, 1984

[54] INTERACTIVE VIDEO DISC SYSTEMS

[76] Inventor: Dale F. Rodesch, 13020 Broili Dr., Reno, Nev. 89511

[21] Appl. No.: 341,964

[22] Filed: Jan. 22, 1982

[51] Int. Cl.³ .............................................. H04N 5/76
[52] U.S. Cl. ........................... 358/342; 273/DIG. 28; 434/43
[58] Field of Search ............... 358/310, 311, 312, 335, 358/342, 22; 360/10.1, 10.2, 14.1, 14.2, 14.3; 273/DIG. 28, 313; 364/521; 434/43, 307, 323

[56] References Cited

U.S. PATENT DOCUMENTS

| | | | |
|---|---|---|---|
| 3,732,362 | 5/1973 | Kinjo | 360/10.1 |
| 4,094,013 | 6/1978 | Hill et al. | 358/342 |
| 4,139,868 | 2/1979 | Eisenberg et al. | 358/335 |
| 4,142,209 | 2/1979 | Hedjund et al. | 358/342 |
| 4,305,131 | 12/1981 | Best | 364/521 X |
| 4,360,876 | 11/1982 | Girault et al. | 364/521 |
| 4,361,849 | 11/1982 | Bolger | 358/312 |
| 4,402,018 | 8/1983 | Wada et al. | 358/342 |
| 4,423,497 | 12/1983 | Sugiyama et al. | 358/312 |

FOREIGN PATENT DOCUMENTS 2649353  5/1977  Fed. Rep. of Germany ...... 358/335

OTHER PUBLICATIONS

Michel Mathieu, "A Random Access System Adapted for the Optical Video-disc: Its Impact on Information Retrieval", pp. 80-83.

Primary Examiner—Donald McElheny, Jr.
Attorney, Agent, or Firm—Grover A. Frater

[57] ABSTRACT

An interactive video disc system employs discs in which video presentations are arranged in parallel in a single spiralled track by being arranged in adjacent turns, or portions of turns, of the spiral. Additional capacity for interaction is achieved by the use of multiple heads and switching from one presentation to another during the formation of picture lines. Different scenes of video information are arranged in an interleaved format on the disc. This format permits special effects involving superimposition of the different scene data to obtain a combined smooth flowing scene without any disturbance in display of the combined scene.

14 Claims, 4 Drawing Figures

INTERACTIVE VIDEO DISC SYSTEMS

TECHNICAL FIELD

This invention relates to interactive video disc systems and to video discs for such systems.

BACKGROUND ART

An interactive system is one which presents to a user a program taken from a number of predefined response programs selected on the basis of the user's inputs. Examples are found in interviewing machines, teaching machines, and interactive games.

Prior systems usually employed prerecorded questions and responses, each on a different magnetic tape which were selected and played back in response to simple user inputs. The number of different responses was limited by the number of magnetic tape players that could be packaged in a system.

In some cases the responses and questions were recorded sequentially in segments on a single tape and the tape was run in either direction to search for a particular segment. That scheme involves variable delays between the time of input and response because search time is a function of the position which the segment to be played occupied along the length of the tape.

In the case of video tape, the size and cost of play back units was sufficiently great to make the use of multiple players prohibitive. Most video output machines employ a single tape or disc, or a single film, and they resort to searching for the required segments.

The time delay can not be tolerated in the case of video games. The game machines abandoned analog techniques and employed digital information instead. The display was limited to "stick men," to vertical or horizontal movement on the display screen, to localized increases in brilliance, and other simplistic representations. Early games utilized a limited number of responses stored in semi-conductor memory devices which were selected by simple digital logic units in response to a limited number of permissible user inputs. Addition of central computing units and more memory made increased variety and complexity possible, but it did not overcome the limitation to "stick men" and other simplistic displays.

Prior to this invention true interaction, using analog video pictures, was not available. It has been made available by the invention in a number of different forms.

DISCLOSURE OF INVENTION

The invention employs one or more of several basic techniques and apparatus to implement their use. In one of those techniques, two or more video presentations are arranged in parallel tracks on a storage medium. In the preferred mode, those presentations or scenes take the form of successions of video picture frame information which, in some tracks, may be repeated several times over the length of the track. The information is recovered using multiple reading units or by selectively shifting the track and reading unit to "read" the information in a selected track.

Another technique involves the use of endless or loop tracks on which video picture frame information is formed so that the same frame or sequence of frames may be displayed repetitively. When the information is stored on a disc, or cylinder, or other medium, the several regions of which may be accessed simultaneously, it is not necessary to use endless or loop tracks, but the technique is otherwise the same.

Combined with the parallel track arrangement described above, or the digital techniques which have been developed in the video game art, or both, the endless loop technique permits interactive programs that are more versatile, interesting, realistic and persuasive than has been possible in the past.

These several techniques can be practiced with film or tape, but it is preferred to employ video discs which are read using light. Reading with laser beams is preferred. The information recovery apparatus, or "head," includes a low wattage laser, a laser light sensor and an optical system which includes a mirror moveable to direct the laser output beam to a selected one of a number of proximately placed turns of the information track.

The conventional video disc is formed with a spiralled track extending for as much as 54,000 turns in a twelve inch disc. The recorded information is contained in a series of conformations, or pits, which extend along and form the track. The information which constitutes one video picture frame is contained in segments of the track which are separated by short segments in which synchronizing signals are recorded. There is no technical reason why several tracks cannot be formed and spiralled in parallel, or as a series of concentric circles, or why single and multiple track spirals and circular tracks cannot all be used in different areas of the same disc to be read by different heads. All are useful in the invention. What form is preferred will depend upon the application for the system and the form of interaction and display to be provided.

At present, the single spiralled track is preferred because that has become the video disc industry standard, and apparatus for making and using single spiral discs is readily available.

There are two standard video disc machine forms and modes of operation. In the first, the disc is rotated at uniform angular velocity, and in the second, the disc is rotated such that the information track passes the read head at uniform linear velocity. In the first case, the synchronizing information between the fields lies on common radial lines. Two fields, which together form a frame, are recorded in each turn of the spiral so that each field begins and ends on one of two diametrically positioned radial lines which together form a diameter line of the disc. The heads used with such discs include a means for adjusting the optical system to permit reading the information in any of two or more adjacent turns of the spiral. The adjustment of the optical system can be changed to switch from one turn to another during detection of the synchronizing segments of the track. That facility is used to provide the "stop frame," reverse, a fast forward, and fast reverse - capabilities of standard video disc play back machines.

The invention can, and in the preferred form does, utilize that turn selection facility. The spiralled track is viewed as a succession of adjacent but individual turns which may be selected one from the others at each radial line that marks the ends and beginnings of fields. Video picture frames from different successions of pictures are recorded on adjacent turns of the track. Using the constant angular velocity format, two or more fields, each taken from a different sequence of fields, are recorded on at least some of the turns of the spiralled track. The succeeding fields, or field groups, are recorded on an adjacent turn or a turn two or three (or even more) removed from the turn on which the preceding field, or field group, of the series was recorded. In each case, the succeeding field or group, begins on the radial line at which the preceding field, or group, ended. The read head must be moved from one turn to another to read the fields of the series. The movement is accomplished optically by track switching and by movement of the head itself over the surface of the disc. Switching from one sequence of frames, or visual presentation, to another presentation or sequence of frames is accomplished by optical switching between turns.

Optical switching combined with simultaneous and-/or alternate reading of other track segments by additional heads provides a number of presentation alternatives that can make possible a very effective interactive system. The preferred system is one which offers maximum alternatives, and thus combines turn switching and multiple heads, some movable and some fixed. In addition, the preferred system also incorporates a means for displaying information from different video presentations in different areas of a single video frame.

The system is made interactive when the user can introduce any of a number of inputs and evoke an appropriate response from a number of available responses. The invention provides a means for accomplishing interaction which incorporates apparatus for utilizing the preferred techniques of the invention.

DESCRIPTION OF THE PREFERRED EMBODIMENT

Which of the features of the invention are employed, and which structural arrangement best serves the purpose, will vary from application to application. For example, interactive teaching machines used to sell products or to teach bank patrons how to use automatic tellers may be configured quite differently, and certainly will be different from video game machines.

The best mode for practicing the invention is illustrated in the video game application. The most popular are the "space war" games, and that is what has been selected for illustration and description. The object in this version of the game is to shoot and destroy attacking fighter craft from a gun position on a space ship. What the player sees on a monitor screen is an analog video display in full color of a science fiction fighter combat and fighter attack such as might have originally been filmed or video taped as a segment of a motion picture or television show. In addition, the display includes a gun sight and a means for firing imaginary projectiles at the fighters on the screen. If the trigger is squeezed, the video program will continue uninterrupted unless, at the time the trigger was squeezed, the reticle was positioned on an attacking craft. In that circumstance, the display changes and, in full analog color, the fighter explodes at the point at which it was struck. The debris from the explosion continues along the path of the craft and then disappears from view at the edge of the screen. Thereafter, the original program is returned to the screen not at the point at which it was interrupted, but at the point which represents an elapse of program time corresponding to the time that the alternate program was displayed.

Figure 1:
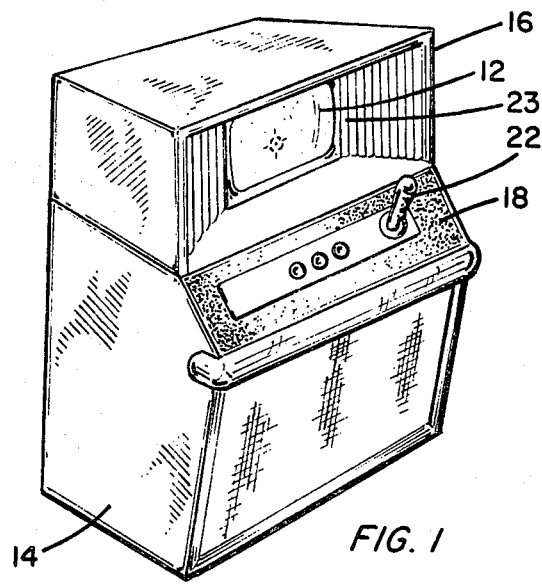
FIG. 1 is a perspective view of a video game machine which embodies the preferred form of the invention.

FIG. 1 depicts the video game apparatus 10 in finished and preferred form. It comprises a video monitor 12 and a cabinet 14 on which the monitor 12 and its hood 16 are mounted. The sloping panel 18 of the cabinet is styled to simulate the control panel at a gun control station of a spaceship. A handle 22 is provided for directing the reticle which appears on the monitor screen during play and which moves as the handle moves. A trigger on the handle is squeezed by the player to "fire" the guns.

In this model the forward part of the monitor hood is styled to represent a gun port. Side panels, one numbered 23 which is visible, are spaced from the screen in small degree. They add to the realism of the display by masking the edges of the monitor screen when the player stands at the front center of the cabinet, and by shifting the field of view of the screen when the player leans from side to side with gun handle movement.

Figure 2:
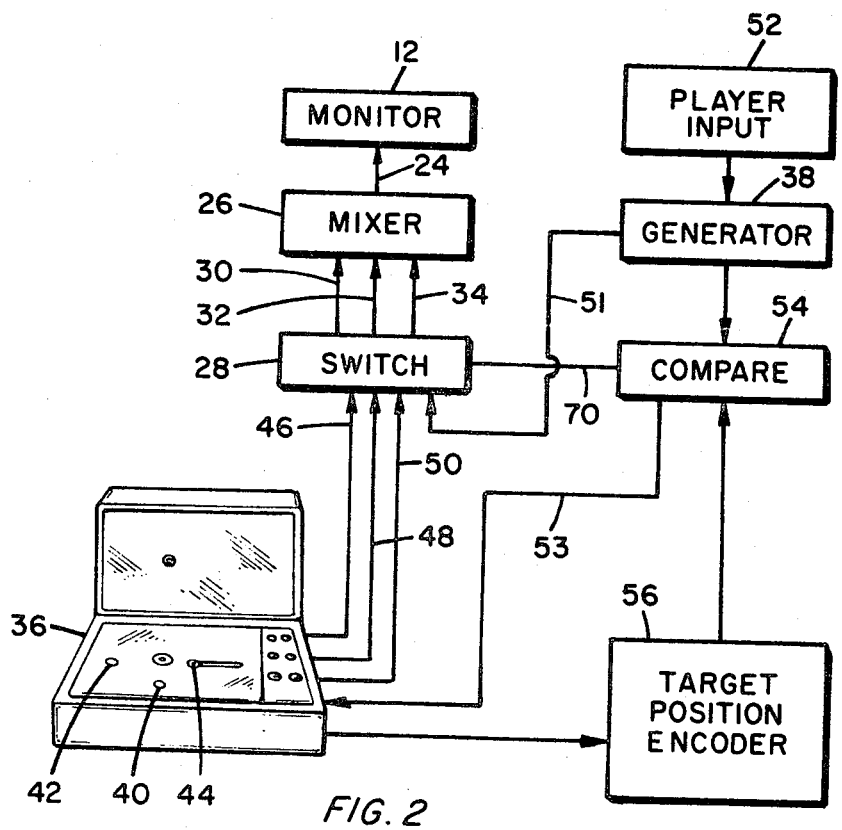
FIG. 2 is a diagram, partly in schematic form and partly in block form, of the elements of the machine of FIG. 1.

The cabinet 14 houses the elements, other than the monitor 12, which are included in FIG. 2. The monitor is a conventional unit of the kind used to display television pictures. Video and audio signals are input to the monitor 12 by line 24 from a conventional mixer 26 whose function is to add input signals from switch 28 for application together to the control electrode of the monitor tube. In this case there are three input lines, 30, 32 and 34, from the switch to the mixer. Depending upon switch operation, these lines pass video signals to the mixer from a moveable head and from one or the other of two fixed heads in player 36, and from a digital signal generator 38, respectively.

The video disc player is a standard, constant, angular velocity player modified to add two fixed pick-up heads 40 and 42. The head 44 is the standard moveable pickup which incorporates the track turn switching optics. Heads 40 and 42 also are standard units, and they incorporate the track turn switching feature.

Lines 46, 48 and 50 carry video signals to the switch from heads 40, 42 and 44, respectively. The line 51 furnishes video signals to the switch 28 from the digital signal generator 38.

The player input box 52 in FIG. 2 represents the "joy stick" and trigger switch common in video game practice and which, in this case, includes the handle 22 with its trigger switch. The handle controls the position on the monitor screen of a cross-hair and reticle which are generated by the digital signal generator 38. This generator is the same as those employed in many video shooting games. Just as in those games, squeezing of the player trigger generates signals that produce flashes of light on the monitor to indicate the direction the projectiles follow and to produce a flash of light on the monitor screen at the position of the cross-hairs and reticle.

The same signals that control reticle position on the screen are furnished to a comparator 54 whose output on line 53 determines which of five video program displays, A, B, C, D, or E, is selected by the head 44 for delivery to the switch on line 50. The line 53 signal also dictates which of eight frames will form an F sequence selected by head 42, and which of two G sequences is selected by head 40. The criteria for display selection is explained below. The system elements which accomplish selection are the conventional digital comparator 54 which matches target position information received from head 44 through target position encoder 56 with digital information received from the reticle position generator 38.

The encoder 56 is a memory unit in which is stored, for each group of frames in the A program sequence, the position on the screen of the fighter ship targets. The A sequence is the presentation of the attacking fighter ships. For the most, those ships appear at the edge of the screen and fly across and out of view at a different edge. In this model the screen is divided by several horizontal and several vertical imaginary lines into area zones. The video presentations B, C, D, and E depict the disintegration of a fighter ship in four different ones of those zones. Selected ones of the F frames are displayed in series, and they depict a close-up, full screen explosion. They are presented only when a fighter is hit at close range. Presentations G3–G4 display what appears to be portions of the spaceship at the sides of the gun port which come into view at the right and the left of the screen when the reticle is moved to the far left and to the far right, respectively.

Figure 4:
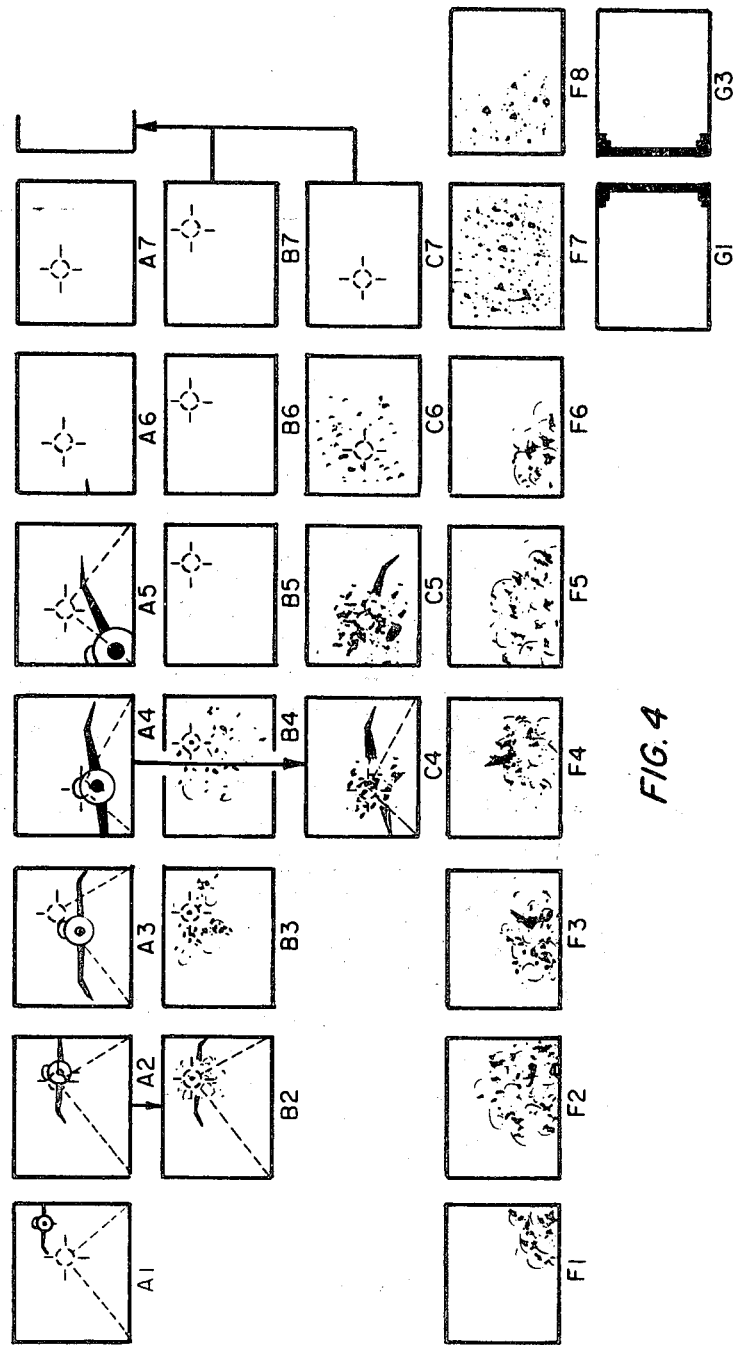
FIG. 4 is a schematic representation of several series of video picture frame sequences that are recorded on the disc of FIG. 3.

Portions of the frame sequences that form video presentations A, B and C are depicted in FIG. 4 along with the F frames which depict a close-up disintegration. Also shown are two of the G frames which depict the right and left edges of the gun port, respectively. The D and E sequences are not shown, but are similar to sequences B and C. Except that the G frames, when shown, are shown simultaneously with the A frames, only one of the A, B, C, D, E and F sequences are displayed at any one time.

It is standard practice in the industry to number each frame and to include the number in the video information that forms a part of each frame. The coordinates of each target in each frame of the A sequence are placed in memory in the target position encoder 56 except that it is not necessary to insert coordinates of target positions in which it is decided that no "hit" will be allowed. Along with the coordinates for the target, there is stored a code number to indicate whether the target lies at medium range or close range in each frame. If the target is struck at medium range, then the disintegration of the target will be depicted by one of the sequences B, C or D, whichever shows an explosion closest to the zone occupied by the target when hit. Nearness of a target is represented by increased size. When a target is hit at close range, its disintegration is depicted by a frame selected from the F frames. Frames F1 and F2 depict an explosion at the lower right of the screen, whereas frames F5 and F6 depict an explosion at the lower left. These frames are arranged in two predefined sequences with the other F frames. The sequence is predefined on the basis of target position when hit.

Figure 3:
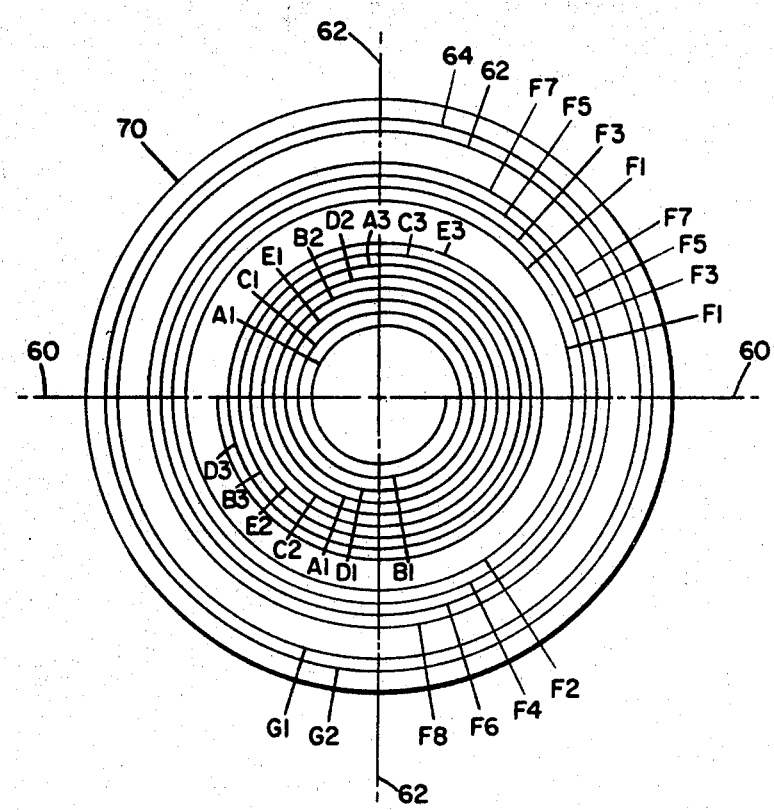
FIG. 3 is a schematic representation of the video disc which forms a part of the preferred embodiment of the invention.

These several programs can be recorded on storage media of any of several types. However, in the preferred embodiment of the invention, the video and related audio presentations are stored on a video disc for use in a laser disc player like the player 36 of FIG. 2. A typical video disc arranged for reading with a laser head is twelve inches in diameter and carries audio and video information in a 54,000 turn spiral track formed by conformations in the disc surface. A modified disc is shown in FIG. 3. The central region of the disc is formed with a spiral track some of the turns of which are represented schematically and are identified by letters A through E. Surrounding the spiralled track, near the edge of the disc, is a pair of circular tracks identified by the letter G. Between the G tracks and the spiralled track is another group of four circular tracks identified by the letter F. The edge of the disc is identified by the numeral 70. The disc is arranged for rotation at constant angular velocity and the video information is contained in semi-circular segments of the track which begin and end, in the case of the spiralled track and the four F tracks, on the diameter line 60—60. Synchronizing information occurs in each turn along that diameter line on each side of the disc center. It should be noted that other numbers of segments may be used, but the two segment arrangement is now preferred.

The head 40 of player 36 in FIG. 2 lies at right angles to the line on which heads 42 and 44 are placed so that frame change for the video frames represented in the G track begin and end on the diameter line 62—62 which is placed at right angles to the diameter line 60—60.

Information contained in all of the track segments F1 through F8 are depicted in the "F" video frames shown in FIG. 4. The information in segments G1 and G2 is the same, and the information in segments G3 and G4 is the same, so only one of each pair is depicted in FIG. 4. In the spiralled track, the frames of the several sequences A through E are arranged in parallel in special fashion.

Examination of the spiralled track in FIG. 3 will show that each turn of the track contains two sets of video frame information, each taken from a different one of the several presentations A through E. Beginning at the center of the spiral, the first semi-circular segment, the one below the diameter line 60—60, contains no video information. The other half of that turn, the upper semi-circular segment, contains the frame A1 information. The first half of the second turn contains the information for frame B1, and the second half of the second turn includes the information for frame C1. The first half of the third turn contains the frame D1 information, and the last half of the third turn contains the E1 frame information. The first half of the fourth turn contains the A2 information. The arrangement is an example of what may be called "interleaving" of video program information. As the disc rotates counterclockwise in FIG. 3, a laser beam carried by head 44 is directed at the conformations of the track, and is reflected back to a sensor which converts the information contained in the character of the conformations of the track into a video and audio signal. As the disc rotates, the head 44 is moved from a position under the beginning of segment A1 outwardly toward the outer edge of the spiral. The head moves at a rate which ensures that it follows the spiralled track. However, the optical system within the laser read head is adjustable by a signal applied by line 53 in FIG. 2 so that it will read the track conformations in any one of the five turns of the spiral that are immediately under the head.

Let it be supposed that the disc of FIG. 3 is placed in player 36 such that the turns of the track that contain the video information corresponding to frames A1, C1, E1, B2 and D2 overlie head 44. By appropriate adjustment of the signal on line 53 of FIG. 2, the head can be adjusted to read the information in any one of those five frame segments.

If the player does not depress the trigger, no target will be hit, and only the A presentation will be displayed on the video monitor. In that case, following a half rotation of the disc during which frame A was read, a signal on line 53 would adjust the optics so that the laser beam would be moved from the end of the first turn of the track to the beginning of the fourth turn of the track. Instead of reading the B1 frame at the beginning of the second turn, it would read the A2 frame at the beginning of the fourth turn. Following the next 180 degrees of rotation of the disc, at the end of the first segment of the fourth turn, the optical system would be transferred to the beginning of the A3 frame in the sixth turn. With each half turn the optical system would be moved from the end of the current half turn, past the preceding turn, to the beginning of the next succeeding turn. That process would continue as the whole of the A presentation was made to appear on the moniter.

It can be demonstrated that the head will have to be moved along the spiral at a rate greater than the normal rate by a factor which corresponds to the number of presentations that are available in the spiralled track.

Next, let it be supposed that the player squeezes his gun trigger during the course of the A presentation. The coordinates of the reticle generated in generator 38 are compared in comparator 54 with the coordinates supplied by the target position in encoder 56 for the A sequence frame currently being displayed. If the coordinates do not match, the signal on line 53 remains unchanged, and the head 48 continues to read the A sequence of frames. If, however, the coordinates of the reticle and the coordinates of the target match, then the signal on line 53 will be changed in accordance with the zone in which the target and reticle were matched, and in accordance with the distance signal supplied by the target position encoder 56. If the target was at medium distance, and in the zone corresponding to the B presentation, the signal on line 53 will cause the optics in the head 44 to shift to the turn in which the B presentation appears at the next synchronizing signal. If the target was struck when in the zone, and at the distance corresponding to the C position, the signal on line 53 would have caused the head 44 optics to shift the laser to the turn containing the C frame.

In the case of a hit when the target is close, the signal provided by the compare unit on line 70 to the switch 28 will switch off the video line 50 and will switch on the video line 48 so that it is the output of head 42 which reaches the mixer and ultimately the monitor 12. The signal on line 53 determines whether the head selects the F frames to show a left corner or a right corner disintegration.

When the reticle positioning handles are pushed fully to the right or left, the generator 38 supplies a signal to the switch 28 which permits the output of head 40 to pass to the mixer for addition to the information supplied by head 44 so that either the G1 and G2 frames, or the G3 and G4 frames, are supplied to the monitor along with the A presentation supplied by head 44.

An internal arrangement permits blanking the A presentation signal during the course of each line sweep in the picture tube, and presentation of an alternate video signal for the remainder of each line. That feature permits the showing of a display one area of which is taken from one sequence of frames and another area of which is taken from a different sequence.

I claim:

1. The method of manufacturing a video disc for use in an interactive system with an information recovery element which is capable of selectively recovering information from any one of two or more proximate positioned turns of a multiple turn track, which method comprises the steps of:
    making a multiple turn track of video information by embodying video information in the disc surface such that each video field group begins and ends on a radial line which is common to the beginning or end of another video field group, and embodying said information to conform to the video information in at least two portions of video field successions each of which successions forms a separate video scene, and embodying said information such that portions of the successions are alternated in series along said track and are arranged such that the end of each portion of the succession lies on the same radial line as does the beginning of the next portion of the same succession but in a different turn of the multiple turn track.

2. The invention defined in claim 1 in which the scene represented by one of said two successions of fields contains portions that are repeated in an interval during which the scene represented by the other of said successions does not contain repeated portions.

3. A rotatable video disc formed with a multiple turn track having video information formed along the track;
    said video information comprising a plurality of successions of video picture fields, the fields of each succession together constituting a representation of related information;
    said video information being arranged along the track in a series of sequences, each sequence being formed as a series of portions of said successions taken one portion from each of said successions, the order in which portions are taken from said successions being the same in each sequence.

4. The invention defined in claim 3 in which each of said portions of successions constitutes one or more of said fields.

5. The invention defined in claim 4 in which the number of fields taken from any one of said successions is the same in each sequence of said series of sequences.

6. A rotatable video disk formed with a multiple turn track having video information embodied along the track;
    said video information comprising at least two successions of video picture fields, each succession representing a different video program;
    each of said successions of fields being divided into at least two portions, each portion constituting at least one field;
    said portions being alternated along the length of the track such that a first portion of a first succession of said plurality of successions is followed by a first portion of a second succession of said plurality of successions which is followed by a second portion of said first succession which is followed by a second portion of said second succession;
    information reading means for recovering the video information from the track one field at a time; and
    control means for selectively causing said information reading means to recover the information in the successive fields of a selected one of said successions by recovering the information in a segment of one turn of the track and thereafter recovering the information in a succeeding segment of an adjacent turn.

7. The invention defined in claim 6 in which said information reading means comprises means for simultaneously recovering information one field at a time from two segments of said track at spaced points on said disc.

8. The invention defined in claim 6 in which said conformation reading means comprises at least two spaced information readers at least one of which is responsive to control by said control means.

9. The invention defined in claim 6 which further comprises a video display device connected to said information reading means and operative to display information recovered by said information reading means.

10. The invention defined in claim 9 which further comprises means for furnishing to said video display device, for simultaneous visual display with information furnished by said information reading means, video information derived from a user controlled source other than said information reading means.

11. The information defined in claim 9 which further comprises means for furnishing to said video monitor, for display during the period of selected fields, information derived from more than one segment of the track which segments contain fields from different presentations.

12. The invention defined in claim 6 in which each portion of a succession occupies that segment of a turn which lies on one side of a diameter line of said disc whereby each succeeding portion of any of said successions of presentations occupies a segment which begins in a different turn at the diametric line on the side of the center at which the segment occupied by the preceding portion of the succession ended.

13. The invention defined in claim 6 in which the first portion of said first succession of frames and said first portion of said second succession of frames are each constituted by a like number of frames; and said second portion of said first succession of frames and said second portion of said second succession of frames are each constituted by a like number of frames.

14. The invention defined in claim 13 in which said control means is capable of causing the information reading means to read the portions of information so interleaved in said tracks such that a number of the portions of one succession of said plurality are read in series followed by a reading of a number of the portions of another succession of said plurality in series.

* * * * *